2,796,004

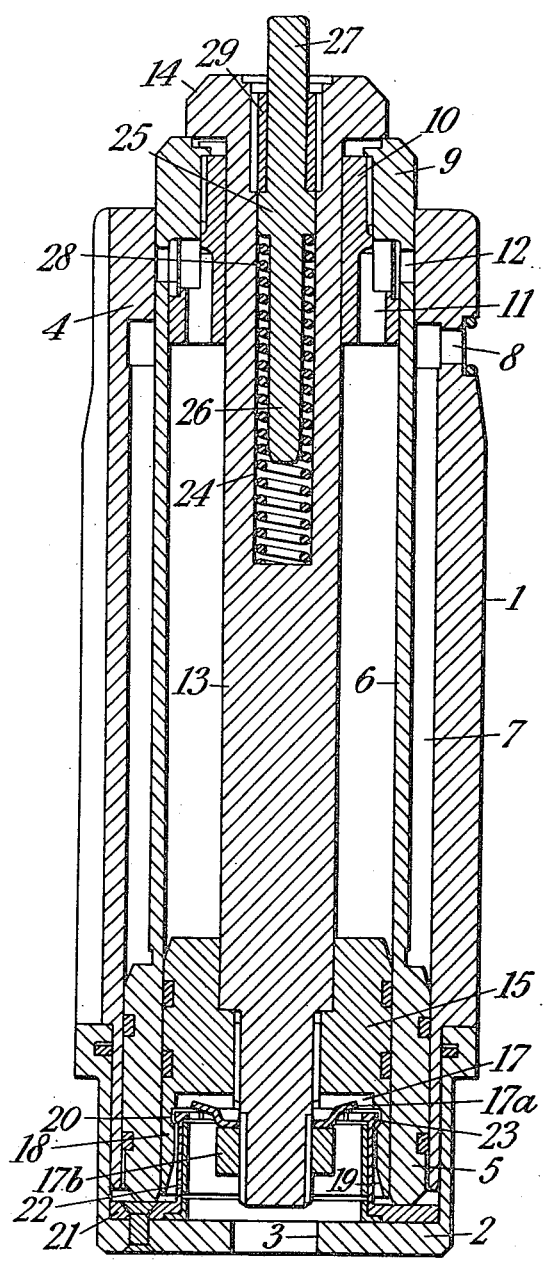
INVENTORS
Henry William Trevaskis
Douglas Dewar
by Benj. T. Rauber
their attorneys

United States Patent Office 2,796,004
Patented June 18, 1957

COCKING MECHANISMS FOR AUTOMATIC GUNS

Henry William Trevaskis, Solihull, and Douglas Dewar, Wolston, near Coventry, England, assignors to Dunlop Rubber Company Limited, London, England, a British company Application November 2, 1953, Serial No. 389,823

11 Claims. (Cl. 89—1)

This invention relates to cocking mechanisms for automatic guns, particularly for aircraft.

Aircraft guns and cannon are usually automatic in operation once the firing mechanism has been initially cocked by moving the bolt rearwardly against its spring, in which position it is held by a sear operated by the trigger mechanism. This operation can rarely be performed manually in aircraft, particularly fighter aircraft, since the guns or cannon are usually located in the wings or other inaccessible places.

Gun-cocking mechanisms are provided for cocking guns situated in inaccessible locations, said mechanisms usually comprising a fluid pressure operated jack situated adjacent the bolt of the gun and arranged to force the bolt rearwardly when the jack is pressurized. The movable part of the mechanism to contact the bolt, e. g. the piston rod, is normally spaced a short distance away from the bolt when said bolt is in its forward position and when the mechanism is fully contracted. It has been found, however, that due to the vibration of the gun when it is being fired, the piston rod tends to "wander" outwardly until it is struck by the rapidly reciprocating bolt and forced inwardly again. This may happen, e. g. every half-dozen or so rounds fired. The effect of this is that the end of the piston rod is soon damaged and the cocking mechanism rendered useless.

Our invention provides an improved cocking mechanism for automatic guns wherein means are provided for holding the relatively movable parts together when the mechanism is in its contracted state.

According to our invention a cocking mechanism for automatic guns comprises a cylinder adapted to be connected to a source of fluid pressure, a piston fluid-tightly slidable in said cylinder having a piston-rod associated therewith to contact a part associated with the bolt of the said gun, a skirt extending axially from one side of said piston having a guiding surface leading to an annular recess, and a plurality of spring latches secured to the adjacent end of the cylinder each having a projection on its end, whereby on the piston moving towards said end of the cylinder the latches are first deflected by the guiding surface on the skirt, the projections then moving into the recess to hold the piston at said end of the cylinder.

Preferably said cocking mechanism comprises an annular piston fluid-tightly slidable in said cylinder having a tubular tail-piece extending axially from one side thereof and through the end of the cylinder and a second annular piston fluid-tightly slidable in said tail-piece having a piston rod extending axially therefrom through the end of the tail-piece, the end of said rod being arranged to contact the bolt of the gun. Such a mechanism occupies only a small volume when contracted, but extends to a considerable length. The inner piston is provided with an annular skirt having a guiding surface and an annular recess on the inner periphery thereof to co-operate with the latches secured to the end of the cylinder, the latches first being deflected inwardly by said guide surface and then moving outwardly so that the projections thereon move into the annular recess.

Preferably the end of the piston rod, i. e. the end to contact the bolt of the gun, is provided with a spring-loaded plunger mechanism which provides the extra thrust necessary, when the mechanism is being returned to its contracted state, to overcome the friction in the mechanism and return it to its fully closed and locked position.

In order that the invention be more fully described reference is made to the attached drawing which is a sectional view of one embodiment of the invention.

An outer cylinder 1 is fluid-tightly sealed at one end by a cover cap 2 which is provided centrally with an aperture 3 for the passage of pressure fluid. The end of the cylinder remote from the cap is provided with an inwardly extending annular flange 4.

An annular piston 5 is fluid-tightly slidable in said cylinder and has a hollow cylindrical tail-piece 6 extending axially from one side thereof, slidable through said annular flange, and projecting beyond the end of the cylinder.

An annular gap 7 between the inner periphery of the cylinder and the outer periphery of the tail-piece communicates with atmosphere through a plurality of radially extending apertures 8 formed in said cylinder adjacent the annular flange, said apertures being protected by a conventional filter medium.

The end of the tail-piece remote from the annular piston is provided with an inwardly extending annular flange 9 and secured within the tail-piece adjacent said flange is a sleeve 10 provided with a plurality of axially extending passages 11. These passages communicate through radially extending ports 12 in the wall of the tail-piece with the exterior thereof, said ports being protected by a conventional filter medium.

A cylindrical rod 13 is slidably fitted through said sleeve, one end thereof being provided with a flange 14 to abut the inwardly extending flange of the tail-piece.

The end of the rod remote from the flange is stepped down to a smaller diameter portion, and the end of said portion is also stepped down to a portion of even smaller diameter. Both said portions are threaded, and an annular piston 15 is screwed to the larger diameter threaded portion and makes a fluid-tight seating on the step between said portion and the rod. The face of the piston 15 adjacent the cover cap 2 is provided with a diametrically-extending rib 17. A dished locking member 17a is provided with two diametrically opposed slots which engage with said rib, said member being located on the smaller diameter portion of the rod, and held thereon by nut 17b. The locking member thus prevents rotation of the piston 15 relative to the rod 13. The piston is fluid-tightly slidable in the tail-piece and is provided, at its outer periphery on the side adjacent the cover cap, with an axially extending skirt 18. The inner periphery of the skirt is provided at its end adjacent the cover cap with an outwardly tapering guiding surface 19 and at its other end with an annular recess 20.

A flat annular member 21 is secured to the inside face of said cover cap and from its inner periphery there extends a plurality of spring latches 22, each having an outwardly extending projection 23 on its end. These latches are adapted to be deflected inwardly by the guiding surfaces 19 on the skirt of the piston as said piston approaches the flat annular member, and then, as the piston abuts said member, to move outwardly again to allow the projections to fall into the recess 20, thus holding the cocking mechanism in its fully contracted state.

The flanged end of the rod is provided centrally with an axially extending hole 24. A plunger 25 is slidably fitted in said hole having a spring guide 26 extending from one side inwardly into the hole and a spigot 27 extending from the other side outwardly of the hole. A helically wound spring 28 is fitted in compression over the spring guide between the plunger and the base of the hole. The end of the hole remote from the base thereof is threaded and a collar 29 is fitted therein to abut one side of the plunger to restrict movement thereof in one direction.

The cocking mechanism of the present invention is mounted adjacent the breech of the gun, the longitudinal axis thereof being parallel to the axis of the barrel of the gun. The aperture in the cover cap 2 is connected to a source of fluid pressure. When the mechanism is mounted in position the spigot 27 associated with the piston rod 13 is in an axial alignment with a part of the bolt of the gun, but is spaced a short distance away from said bolt, and the projections 23 on the latches 22 are located within the annular recess 20 of the inner piston.

To cock the gun, a fluid pressure valve is operated by the pilot of the aircraft to allow pressure fluid to flow through the aperture 3 into the cylinder 1. Both pistons 5 and 15 are moved back by said fluid pressure, the latches 22 deflecting to allow the projections 23 thereon to move out of the recess 20 in the skirt 18 of the inner piston 15. Air behind the pistons is forced out of the mechanism through the apertures 8 and the ports 12. The outer piston 5 slides in the cylinder 1 until it abuts the flange 4, and the inner piston 15 slides in the tail 6 of the outer piston until it abuts the sleeve 10 secured within the end of said tail. In this position the cocking mechanism is fully extended.

As the piston rod 13 moves outwardly the spigot 27 contacts the bolt of the gun and is forced back against spring 28 until the flange 14 at the end of the piston rod 13 contacts said bolt. The bolt is then moved rearwardly against its spring by the continued motion of the cocking mechanism until the gun is cocked and the bolt is held against forward movement by the sear of the trigger mechanism. The pilot then operates his valve to allow the pressure fluid to flow back to the reservoir, the cocking mechanism however remaining in the extended position.

On firing the gun, the bolt moves forward under the action of its spring, carrying the flange of the piston rod with it. The action of the gun is henceforth automatic. As the bolt reaches its forward and firing position and momentarily halts before again being forced rearwardly by the action of the explosive gases, the spring-loaded spigot 27 in the end of the piston rod 13, reacting against the bolt, imparts sufficient resilient force against the resistance in the cocking mechanism to force both pistons home and fully contract the cocking mechanism.

During this final contraction the projections 23 strike the guiding surface 19 and deflect the latches 22 inwardly until said projections are aligned with the recess 20, and move outwardly thereinto. This substantially locks the mechanism against movement caused by vibration or the like.

Air drawn into the annular spaces between the cylinder 1 and tail-piece 6, and the piston rod 13 and tail-piece 6, on the return stroke of the pistons, first passes through the filter mediums, thus ensuring the exclusion of foreign bodies and the like.

Having described our invention—what we claim is:

1. A cocking mechanism for an automatic gun comprising a cylinder adapted to be connected to a source of fluid pressure, a piston fluid-tightly slidable in said cylinder having a piston rod driven therewith to protrude from said cylinder and contact a part associated with the bolt of said gun, a skirt extending axially from one side of said piston having a guiding surface and an annular recess, and a plurality of spring latches secured to the adjacent end of the cylinder each having a projection on its end, whereby on the piston being retracted toward said end of the cylinder the latches are first deflected by the guiding surface on the skirt, the projections then moving into the recess to hold the piston at said end of the cylinder.

2. A cocking mechanism for an automatic gun comprising a cylinder adapted to be connected to a source of fluid pressure, an annular piston fluid-tightly slidable in said cylinder having a tubular tail-piece extending axially from one side thereof through the end of said cylinder, a second piston fluid-tightly slidable in said tail-piece having a piston rod extending axially therefrom through the end of said tailpiece adapted to contact a part associated with the bolt of said gun, a skirt extending axially from the face of said second annular piston remote from the piston rod having a guiding surface and an annular recess, and a plurality of spring latches secured to the adjacent end of the cylinder each having a projection on its end whereby on the second piston being retracted toward said end of the cylinder the latches are first deflected by the guiding surface on the skirt the projections then moving into the recess to hold the piston fully retracted at said end of the cylinder.

3. A cocking mechanism according to claim 1 wherein the piston rod has an axially extending hole formed in the end thereof remote from the piston, in which a spring-loaded plunger is slidably secured, said plunger having a spigot extending axially therefrom which projects beyond the end of said piston rod.

4. A cocking mechanism according to claim 1 wherein radially extending apertures are provided in the cylinder wall at the end remote from the skirt.

5. A cocking mechanism for an automatic gun comprising a cylinder having at one end an opening to receive fluid under pressure, a piston slidable fluid-tightly in said cylinder having a piston rod extending through the end of said cylinder opposite said fluid receiving opening to contact a part of the bolt mechanism of the gun, a projection from said piston toward the fluid receiving end of the cylinder having a guiding surface and having a latch receiving recess between said guiding surface and said piston and a spring latch fixed to the cylinder and having a portion to fit into said recess when said piston is fully retracted, the engaging surfaces of said latch and recess being inclined to the axis of movement of said piston to yield and release said piston to extend said rod through the end of said cylinder under the pressure of fluid acting longitudinally on said piston.

6. The cocking mechanism of claim 5 in which said recess is an annular recess and in which there are more than one spring latch engaging said recess.

7. The cocking mechanism of claim 5 in which there is an annular piston having a cylindrical extension through the end of said cylinder opposite said fluid inlet opening and in which said piston having the piston rod slides fluid-tightly within the annular piston and cylindrical extension.

8. The cocking mechanism of claim 5 in which said projection is an annular skirt having an annular recess and guiding surface and in which said spring latch has several sections annularly arranged to engage said recess.

9. The cocking mechanism of claim 8 in which the recess and guiding surface are on the inner periphery of the skirt and the latch is within the skirt and secured to the end portion of the cylinder.

10. The cocking mechanism of claim 5 in which said piston is axially recessed at its free end and has a spring pressed plunger in said recess.

11. A cocking mechanism for an automatic gun comprising a cylinder adapted to be connected to a source of fluid pressure, a piston fluid-tightly slidable in said cylinder having a piston rod associated therewith and extensible therefrom to contact a part associated with the bolt of said gun, a skirt extending axially from the side of the piston remote from the said bolt, said skirt having a guiding surface and an annular recess, and a plurality of spring latches secured to the adjacent end of the cylinder, each having a projection on its end whereby on the piston being retracted towards said end of the cylinder the latches are first deflected by the guiding surface on the skirt, the projections then moving into the recess to hold the piston at said end of the cylinder to retain said piston rod clear of the part associated with said bolt.

References Cited in the file of this patent

UNITED STATES PATENTS

| | | |
|---|---|---|
| 2,071,020 | Boussel | Feb. 16, 1937 |
| 2,100,097 | Beharrell et al. | Nov. 23, 1937 |
| 2,329,925 | Mejean | Sept. 21, 1943 |
| 2,356,981 | Drescher et al. | Aug. 29, 1944 |
| 2,411,877 | Heizer | Dec. 3, 1946 |
| 2,413,104 | Goepfrich | Dec. 24, 1946 |